United States Patent [19]

Strubbe et al.

[11] Patent Number: 5,421,777
[45] Date of Patent: Jun. 6, 1995

[54] TAILINGS RETURN SYSTEM FOR COMBINE HARVESTER

[75] Inventors: Gilbert J. I. Strubbe; Jasper Clarisse, both of Zedelgem, Belgium; Russell W. Strong, New Holland, Pa.

[73] Assignee: New Holland North America, Inc., New Holland, Pa.

[21] Appl. No.: 85,381

[22] Filed: Jul. 2, 1993

[51] Int. Cl.⁶ .......................................... A01F 12/52
[52] U.S. Cl. ............................................ 460/13; 460/8
[58] Field of Search ................. 460/13, 11, 12, 903, 460/8, 9, 10

[56] References Cited

U.S. PATENT DOCUMENTS

| 4,677,991 | 7/1987 | Harris et al. | 460/8 |
| 4,783,952 | 11/1988 | Morellini | 460/8 X |

FOREIGN PATENT DOCUMENTS

| 1136202 | 5/1967 | Germany . | |
| 2037446 | 7/1970 | United Kingdom . | |
| 2051541 | 1/1981 | United Kingdom | 460/13 |

Primary Examiner—Terry Lee Melius
Attorney, Agent, or Firm—Frank A. Seemar; Larry W. Miller

[57] ABSTRACT

A combine harvester (1) having a threshing and separating mechanism (8), a cleaning mechanism (9) disposed to receive threshed and separated crop material from the threshing and separating mechanism (8) and operable to separate tailings therefrom. Tailings rethresher means (44) are associated with the cleaning mechanism (9) for rethreshing the tailings separated therein, and tailings conveyor means (52) are provided for recycling rethreshed tailings from the rethresher means (44) to the cleaning mechanism (9). Above the cleaning mechanism (9) at a location offset from a discharge aperture (62) of the tailings conveyor means (52) a resilient screen (86) is provided which, in use, intersects the tailings flow and is operable to absorb the kinetic energy thereof which is imparted thereto by the tailings conveyor means (52). A deflector (72) is operatively associated with a forwardly inclined outlet portion (70) of the tailings conveyor means (52) to evenly spread and project the tailings against the screen (86).

5 Claims, 4 Drawing Sheets

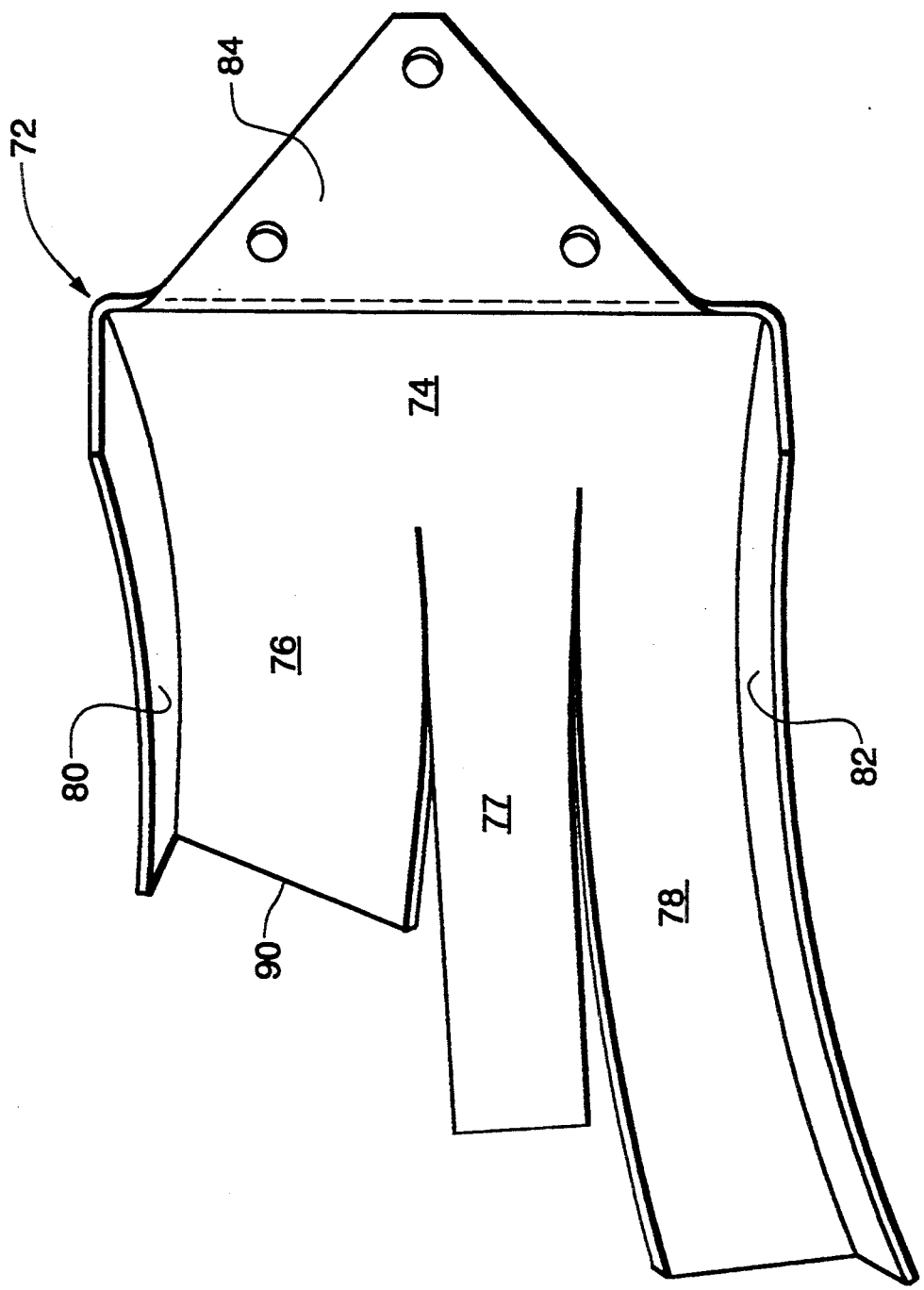

TAILINGS RETURN SYSTEM FOR COMBINE HARVESTER

FIELD OF THE INVENTION

The present invention relates to combine harvesters and more particularly to a tailing recycling device for such machines.

BACKGROUND OF THE INVENTION

In known combine harvesters, grain is threshed and separated in a threshing and separating mechanism and the separated grain, together with impurities of all sorts, such as chaff, dust, straw particles and tailings, is fed to a cleaning mechanism for cleaning. Clean grain is collected below the cleaning mechanism and fed to a grain tank for temporary storage. The tailings are separated from the clean grain and impurities for reprocessing. This reprocessing either involves recycling the tailings through the threshing and separating mechanism or treating them in a separate tailings rethreshing means. In both cases the tailings are conveyed through an elevator which usually is of the paddle type but which also may consist of any other suitable type of conveying means such as an ejector blower or an auger conveyor.

In conventional combine harvesters, wherein the tailings are recycled through the threshing and separating mechanism, a tailings elevator extends at one side of the machine between a location beneath the cleaning mechanism, where the tailings are collected, and a location forwardly and generally above the level of the threshing means at one side thereof and at which location the elevator supplies the tailings to a transverse tailings distributing auger which is operable to spread the tailings more or less evenly across the width of the threshing mechanism. This arrangement of the tailings elevator and the distributing auger is relatively long and hence is expensive and takes up much room, whereby it is cumbersome and access to other components of the machine and drive means therefor is hampered considerably.

Instead of using a tailings distributing auger, it is proposed in DE-A-2.037.446 to discharge the tailings from the tailings elevator by means of a paddle rotor which throws the tailings against a series of chain portions, dangling transversely in front of the threshing mechanism and intended to provide a spreading effect on the tailings flow. While efficient spreading is accomplished, such an arrangement is found to be very sensitive to the tailings flow rate, the composition of the tailings and the density thereof as a result of the uncontrolled rebounding of grain kernels against the chain portions.

In present large capacity machines, the threshing and separating devices have a considerable width, calling for high demands where distribution of the recycled tailings is concerned. Moreover, regardless of the kind of distributing device employed, small percentages of tailings on large capacity machines represent considerable volumes whereby the recycling of these volumes of tailings through the threshing and separating mechanism often may lead to uneven loading and/or overloading of the various components which ultimately results in considerable grain losses.

In other known combine harvesters, independent tailings rethreshers have been provided which are normally arranged to receive the tailings from the cleaning mechanism and to discharge the rethreshed tailings onto the grain pan of the cleaning mechanism to recycle the tailings therethrough. This arrangement is advantageous in as far as the main threshing and separating mechanism can be used to its full capacity without any risk of unevenly loading or overloading it with tailings.

Nevertheless, recycling the tailings directly through the cleaning mechanism also has some disadvantages, a major one arising from the fact that, due to the confined space between the threshing and separating mechanism on the one hand and the cleaning mechanism on the other hand, it is very difficult to provide adequate tailings distributing means which satisfactorily spread the tailings evenly over the cleaning mechanism without hampering the operation of the threshing and separating mechanism as well as the cleaning mechanism.

For this reason, most tailings return devices which recycle the tailings through the cleaning mechanism do not comprise specific distributing means but try to obtain some spreading effect by forcefully ejecting the tailings onto the rear end of the grainpan or eventually onto the front portion of the sieves of the cleaning mechanism from one or both transverse sides of the harvester. A combine harvester employing a tailings recycling mechanism of this nature is disclosed in GB-A-1.136.202. It should be appreciated however that the spreading pattern of the tailings is easily disturbed due to varying volumes or density changes of recycled tailings, which result from varying crop conditions, or varying harvesting conditions, such as operation on transversely inclined slopes.

Moreover, it is well known in the art that the reciprocating action of the cleaning mechanism in general and the grainpan in particular causes a preconditioning effect to the layer of crop material. The grain kernels contained in such layer are urged to sink therethrough and to concentrate at a bottom portion thereof in order to prepare the layer for subsequent cleaning action by the cleaning sieves. Accordingly, discharging the tailings on top of the transported layer at a location behind the threshing and separating area, i.e., already a considerable distance away from the front of the cleaning mechanism and thus at a location where a substantial degree of preconditioning already has occurred, completely undoes the preconditioned state of the layer.

Furthermore, a cleaning mechanism of a combine harvester normally is composed of separate lengthwise sections separated by upstanding dividers which are present on grainpans as well as on cleaning sieves and which are operable to allow only for restricted sideways movement of crop material transported by the cleaning mechanism. When discharging the tailings from a transverse side of the harvester under a sharp angle onto the top of the layer of crop material supported and transported by the grainpan, the grain kernels contained in said tailings have a tendency to penetrate said layer and to continue their trajectory until movement thereof is restricted by a divider, delimiting, in that direction, the section in which the grain kernels have been projected. As a result of this action, grain starts to accumulate on one side of a section whereas the chaff material of the transported layer, which is much lighter than the grain, is dispelled to the other transverse side of the section whereby the even distribution of grain and chaff transversely of a section becomes disturbed. It is clear that concentrating the grain on one side of a section and the chaff material at the other side thereof, results in overloading and underloading of the respective section sides, leading ultimately to grain losses at both sides of a section.

SUMMARY OF THE INVENTION

It therefore is the objective of the present invention to overcome or at least reduce the aforementioned drawbacks and to provide a simple and effective tailings return system which evenly distributes the tailings over a layer of crop material on the cleaning mechanism without disturbing the distribution of the crop material within said layer.

According to the broadest aspects of the present invention, a combine harvester is provided comprising a threshing and separating mechanism, a cleaning mechanism disposed to receive threshed and separated crop material from the threshing and separating mechanism and operable to separate tailings therefrom, tailings rethresher means associated with the cleaning mechanism for rethreshing the tailings separated therein, tailings conveyor means for recycling rethreshed tailings from the rethresher means to the cleaning mechanism, and a screen above the cleaning mechanism at a location offset from a discharge aperture of the tailings conveyor means. The screen intersects the tailings flow and is operable to absorb the kinetic energy thereof which is imparted thereto by the tailings conveyor means.

The foregoing and other objects, features and advantages of the invention will appear more fully hereinafter from a consideration of the detailed description which follows, in conjunction with the accompanying sheets of drawings wherein one principal embodiment of the invention is illustrated by way of example. It is to be expressly understood, however, that the drawings are for illustrative purposes and are not to be construed as defining the limits of the invention.

DESCRIPTION OF THE DRAWINGS

FIG. 4 is a perspective view, to a larger scale, of a component of FIG. 3, as seen in the direction of arrow F.

DESCRIPTION OF THE PREFERRED EMBODIMENT

Figure 1:
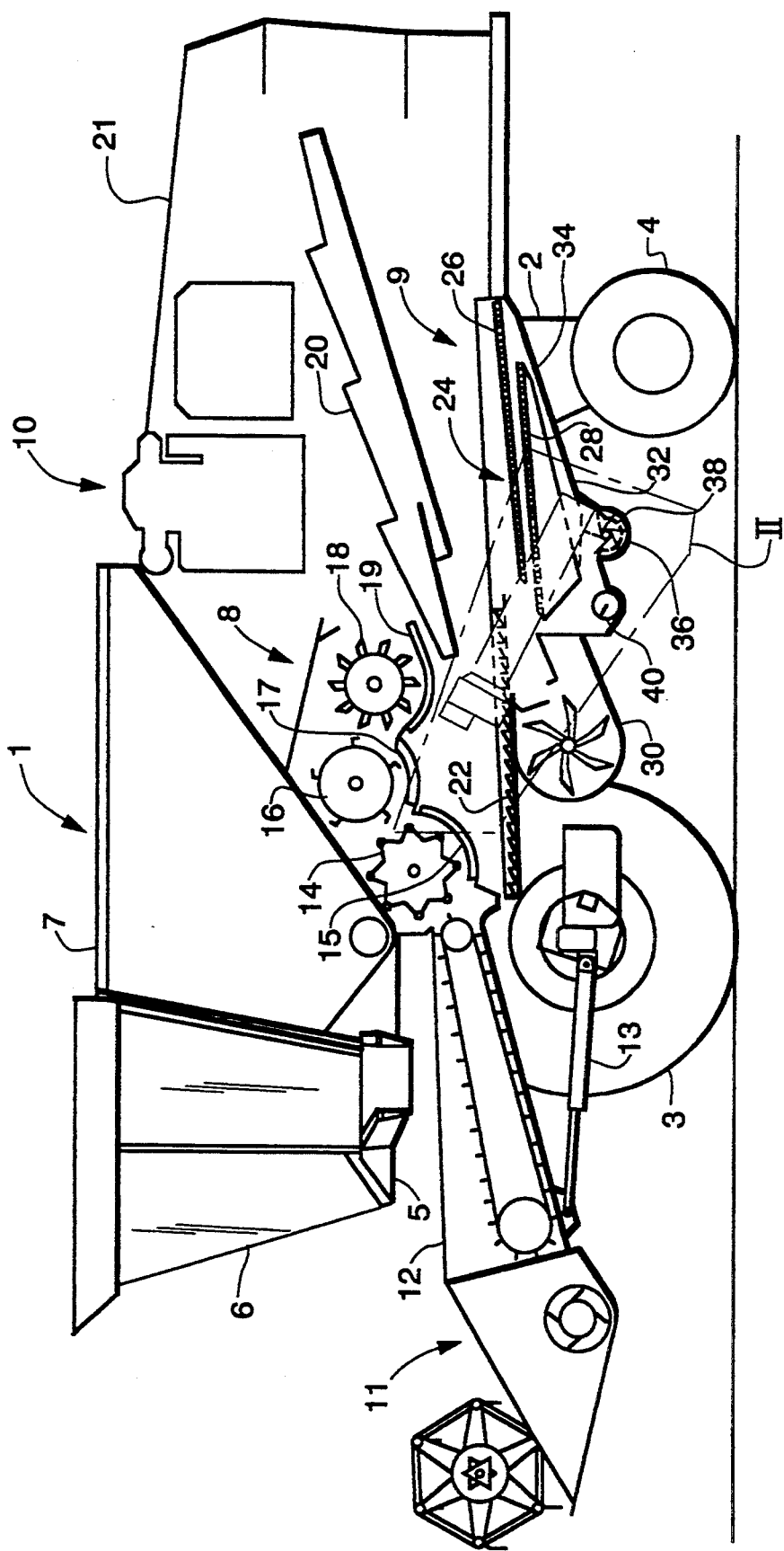
FIG. 1 is a schematic side view of a combine harvester incorporating the present invention.

With reference to the drawings, particularly FIG. 1, a combine harvester, generally indicated at 1, comprises a main frame 2 supported on a front pair of drive wheels 3 and a rear pair of steerable wheels 4. Supported on main frame 2 are on operator's platform 5, with operator's cab 6, a grain tank 7, a threshing and separating mechanism 8, a grain cleaning mechanism 9 and an engine 10. A conventional header 11 and straw elevator 12 extend forwardly of the main frame 2 and header 11 is pivotally secured to frame 2 for generally vertical movement which is controlled by extensible hydraulic cylinders 13.

As combine harvester 1 is propelled forwardly over a field with standing crop, the latter is severed from the stubble by a sickle bar on header 11, whereafter straw elevator 12 supplies the cut crop to threshing and separating mechanism 8. The combine harvester illustrated in FIG. 1 comprises a conventional threshing and separating mechanism including a rotatable threshing cylinder 14 cooperable with a stationary threshing concave 15, a straw beater 16 with a cooperable beater grate 17, and a separator rotor 18 with associated concave 19. Conventional straw walkers 20 are operable to discharge a mat of remaining crop material (i.e. mainly straw as the grain is separated therefrom) through a straw hood 21.

The grain cleaning mechanism 9 exemplified in FIG. 1 is disposed underneath threshing and separating mechanism 8 to receive the separated grain on a grain pan 22. The cleaning mechanism 9 is operatively connected to an eccentric drive (not shown) to effect a generally-fore-and-aft reciprocating movement thereof to convey the threshed grain in a rearward direction. Sieve means 24 are positioned rearwardly of the grain pan 22 to receive threshed grain conveyed rearwardly and clean the threshed grain from chaff, tailings and other debris conveyed therewith. Typically, sieve means 24 include an upper chaffer sieve 26 and a lower cleaning sieve 28 mounted for opposing fore-and-aft reciprocating movement. A cleaning fan 30 is disposed below grain pan 22 and forwardly of sieves 26, 28 to blow air upwardly through the latter to remove chaff and debris from the grain.

A clean grain collecting chute 32 and a tailings collecting chute 34, common in the art, are disposed below sieves 26 and 28 and are arranged to discharge clean grain and tailings received from the sieves into a clean grain auger trough 36 and a tailings auger trough 38, respectively. The clean grain auger trough 36 extends transversely of the combine and contains a clean grain auger 40 having a discharge end adjacent one side of cleaning mechanism 9 to which collected grain is conveyed. A clean grain elevator (not shown) extends from the discharge end, alongside threshing and separating mechanism 8 for elevating the clean grain into grain tank 7 for temporary storage.

Figure 2:
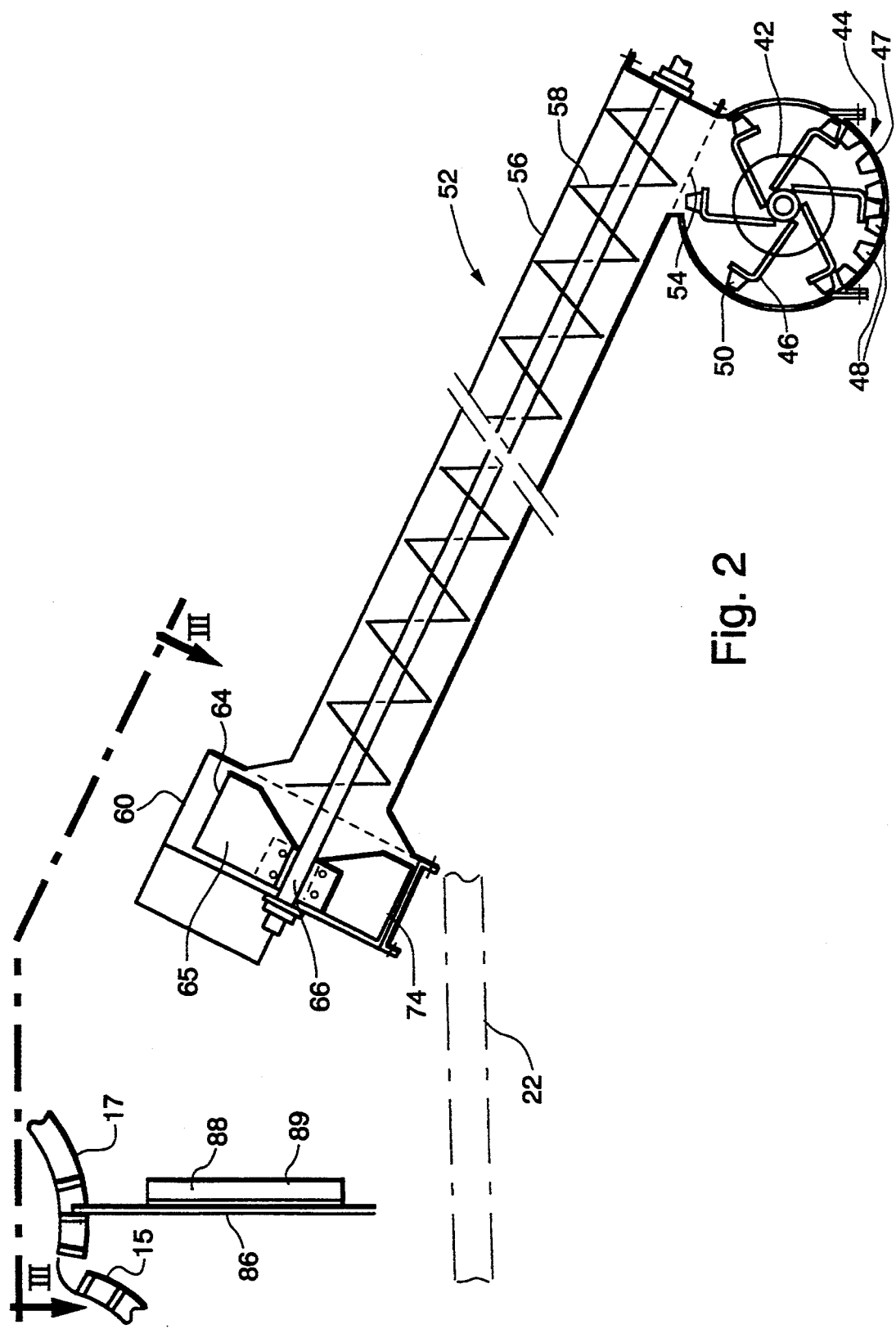
FIG. 2 is a sectional view, to a larger scale, of the components indicated at II in FIG. 1.

The tailings auger trough 38 also extends transversely of the machine and comprises a discharge end at the other side of cleaning mechanism 9 when compared to the location of the discharge end of the clean grain auger 40. Referring to FIG. 2, a tailings auger 42 is disposed in the tailings auger trough 38 for conveying the collected tailings towards a tailings rethresher device, generally indicated at 44 and comprising a tailings rethresher rotor 46 provided in a housing 47. Stationary aggressive rethresher rasps 48, mounted on a section of the inside of housing 47, cooperate with rethresher rasps 50 carried by rotor 46 to thoroughly rethresh the tailings passing between. The operation of the tailings rethresher device is disclosed in more details in GB-B-2.051.541, to which reference is made.

A tailings return conveyor 52 extends between an outlet 54 of tailings rethresher 44 and an aperture in the combine side wall above the level of grain pan 22. The conveyor 52 is inclined upwardly in a forward direction and comprises a cylindrical auger tube 56 in which an auger 58 is installed. At the discharge end, auger tube 56 flares outwardly and is coupled to an impeller housing 60 which extends coaxially with auger tube 56 and has a discharge opening 62 (FIG. 3) coinciding with the opening in the combine side wall above grain pan 22. A rotor 64 having impeller blades 65 mounted on an extension 66 of the shaft of auger 58, is provided in housing 60 and is operable to discharge rethreshed tailings towards grain pan 22. Impeller housing 60 has a cranked shape and comprises a generally cylindrical portion 68 housing rotor 64 which is perpendicularly oriented relative to the machine frame and, a parallelogram-shaped outlet portion 70 which is angled forwardly relative to the machine frame.

As an extension of the rear wall 71 of the outlet portion 70, a deflector 72 is disposed to spread the discharged tailings substantially evenly across the width of grain pan 22. The deflector 72, schematically shown in FIG. 3, comprises a generally straight portion 74 in alignment with the rear wall of housing 70 already mentioned, followed by a series of individual, curved deflector strips 76 to 78, positioned one above the other and of which the individual radius of curvature increases from the deflector strip 76 over strip 77 to strip 78, i.e. from the top to the bottom of deflector 72. As seen in FIG. 4, deflector 72 further comprises extending flanges 80 and 82, delimiting deflector 72 at the top and bottom respectively, giving it a channel-shaped form, and a mounting plate 84 for attaching deflector 72 to frame 2.

Turning again to FIGS. 2 and 3, a screen or canvas 86, which is attached to a front portion of beater grate 17 and hanging down therefrom towards grain pan 22, is operable to form an obstruction for grain material to prevent it from being thrown and scattered directly onto a rearward portion of grain pan 22, i.e., close to the grain receiving portion of the chaffer sieve 26. If the foregoing would occur, then the pre-conditioning action of grain pan 22 would be disturbed in as much as the grain thrown upon the layer of crop material at the rearward region of grain pan 22 would have insufficient time to penetrate the layer, thereby running the risk of not reaching the sieve surface and of being discharged, together with chaff material, onto the ground. The screen 86 stops short of grain pan 22 in order to allow crop material, separated through the thresher concave 15 and piled on the front portion of grain pan 22, to pass freely underneath.

Vertically affixed to the rearward side of screen 86 are a number of angled members 88 and 89 described below.

In operation, the rethreshed tailings are conveyed by auger 58 and discharged in impeller housing 60 where they are engaged and transported in an overshot manner by impeller rotor 64. The impeller blades 65 may be extended (not shown) into auger tube 56 to ensure that, when only small volumes of tailings are recycled, all transported crop material is given enough speed before leaving housing 60. The tailings thus leave impeller housing 60 at the upper region thereof in a generally concentrated flow whereby a substantial part thereof is projected against rear wall 71 of outlet housing 70 in a manner such that the tailings flow is spread over the total height of wall 71 in a virtually condensed layer. Upon leaving housing 70, the threshed tailings are tangentially intercepted by deflector 72 and, dependent on the trajectory followed, are deflected to the one or other side of the machine. Indeed, tailings travelling at the upper region of deflector 72 encounter deflector strip 76 with its large radius of curvature whereby the tailings flowing thereover are guided diagonally forwardly across and above grain pan 22 towards the opposite side. The deflector strip 77 forming a middle part of deflector 72 is operable to direct the tailings more to a central area above grain pan 22. Finally, strip 78 is curved such that the part of the tailings flow passing thereover, rather than being thrown to the side of the harvester opposite to discharge opening 62, is smoothly deflected in a generally straight forward direction so as to keep said part of the tailings at the same side as where it is discharged.

Depending on the degree of inclination of outlet portion 70, some tailings may leave impeller housing 60 without engaging rear wall 71, but nevertheless will encounter deflector 72 and be subjected to the deflecting action thereof.

Figure 3:
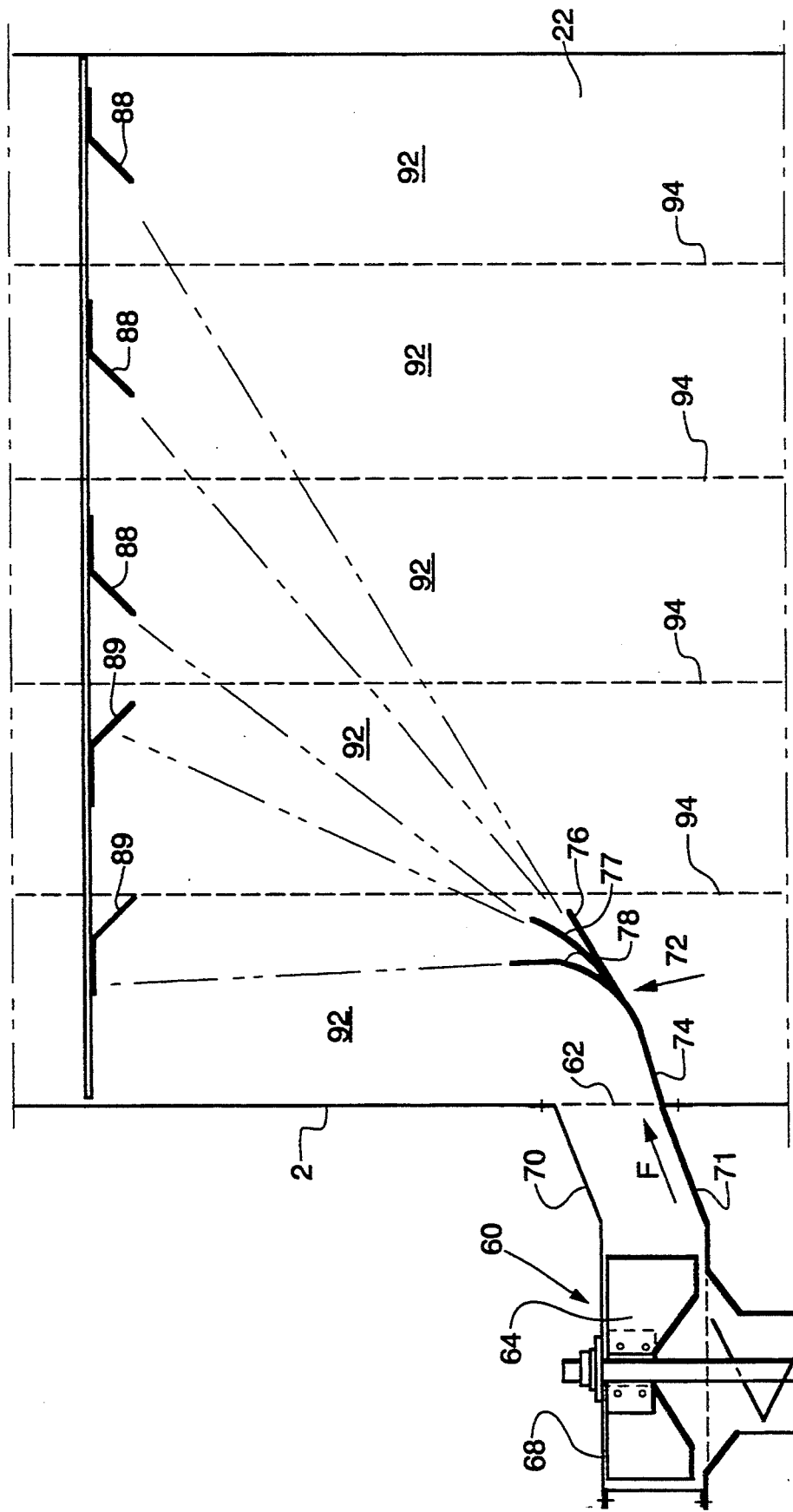
FIG. 3 is a partial sectional top view taken along the line III—III of FIG. 2.

The deflector 72 thus is highly efficient to spread the rethreshed tailings substantially evenly across the width of grainpan 22. To even further improve the spreading effect of deflector 72, as exemplified in FIG. 4, strip 76 is provided with a slanting discharge edge 90, whereby crop material passing thereover at the upper region thereof is released earlier from strip 76, and hence is thrown further to the right as seen in FIG. 3, when compared to crop travelling over a lower portion. Strips 77 and 78 may also be provided with a slanting discharge edge to obtain a same effect.

The main purpose of deflector 72 is not only to procure an even spreading, but also to direct the tailings flow in a forward direction to deliver tailings to grain pan 22 as far forwardly as technically and functionally possible. The reasoning will be clear to anyone skilled in the art, namely prolonging the time that tailings will spend on grain pan 22 and thus ensuring that grain contained in the tailings will have sufficient time to reach the lower slice of the transported layer of crop material before being processed by the cleaning sieves.

A still further important characteristic of deflector 72 is to avoid that recycled tailings are discharged either upwardly towards and into the threshing and separating concaves or that they are projected directly into the crop layer on grain pan 22. To this end, the design of deflector 72 in combination with the configuration of impeller housing 60 is such that the recycled tailings are released from deflector 72 in a generally horizontally directed stream. The upstanding flanges 80 and 82, which delimit the deflector at respectively the upper and lower end thereof, are also provided in this respect. Indeed, flange 80 prevents crop material from leaving deflector strip 76 in an upward direction as such material otherwise would interfere with the threshing and separating function of the threshing and separating concaves. The flange 82 operates in a comparable manner in that tailings which have a tendency to project straight into the layer on grain pan 22 are intercepted by flange 82 and redirected generally horizontally.

In as much as the recycled tailings travel along deflector 72 in a rather concentrated layer, flanges 80 and 82 may be minimal in height but nevertheless perform as expected. Hence, as seen in a vertical direction, deflector 72 takes up only a confined space whereby the separating action of the concaves thereabove is not impeded.

The stream of tailings spread by deflector 72 is intersected by screen 86, which is disposed at right angles to the driving direction and which extends the full transverse width of grain pan 22 at a location offset to the front of tailings discharge area 62. The screen 86 preferable is made of an elastic material such as rubber in order to considerably reduce or completely absorb the kinetic energy of tailings impinging thereon. Consequently, the tailings are slowed down instantly and drop down on grain pan 22 in a generally vertical direction, mainly under influence of gravitational forces. The angled members 88 provided on screen 86 at the right hand side of the machine are generally oriented in the direction of deflector 72 and are operable, as a precautionary measure, to restrict horizontal sideways movement of tailings material in case it nevertheless still would contain enough energy after impact on screen 86 to slide therealong. This material indeed will be caught in the sharp angle between such a member 88 and screen 86 and will equally fall downwardly onto grain pan 22. The other angled members 89 at the left side of the machine and thus nearest to deflector 72 are pointing away therefrom and as such present an additional deflector surface for the tailings flow in order to further improve the delivery of tailings to the left hand side of grain pan 22.

As shown in FIG. 3, grain pan 22 is divided in several sections 92 separated from each other by divider plates 94. Although not compulsory, the positioning of angled members 88 and 89 more or less correspond to the arrangement of sections 92 and, in combination with the spreading effect obtained by deflector 72, ensures that each section 92 receives an equal amount of tailings in a manner such that the interior distribution of the crop material in each section 92 is not disturbed. Of course, the number of angled members 88 and 89 is related to the effective width of cleaning mechanism 9. The curvature of deflector strips 76 to 78 is also related to such width.

Conclusively, a tailings return system constructed in accordance with the present invention offers a simple but nonetheless effective means to spread the tailings evenly over a forward portion of the grain pan 22 without hampering the operation of the threshing and separating mechanism and without disturbing the grain and chaff distribution in the grain pan sections, irrespective of the volumes and composition of the tailings recycled.

Although the present invention has been described with reference to a tailings return system of the auger type, any other suitable type of conveyor system will suffice. In an alternative arrangement, a tailings return device could be provided at both sides of the combine, each such device thus recycling only half of the tailings towards grain cleaning mechanism 9. A deflector at each discharge opening would be operative either to spread the recycled tailings of one side over only half the width of the grain pan 22 or to spread them nevertheless over the total width. In the latter case, the generally oppositely directed streams of tailings would be interlaced. In each case, a flexible screen would be provided to intercept the tailings flow. The screen may be provided with angled members or have a corrugated.

The present invention furthermore can be incorporated in tailings return devices which recycle the tailings through the threshing and separating mechanism of a combine harvester whereby the even distribution of the tailings across the width of such a mechanism is ensured in a simple and effective manner.

Finally, in a still further arrangement, the tailings could be recycled to cleaning mechanism 9 at a location straight underneath the threshing concave 15 proximate to the front end of the grain pan 22. In this arrangement, the tailings would be deflected rearwardly and projected against the front face of screen 86.

While the preferred structure in which the principles of the present invention have been incorporated is shown and described above, it is to be understood that the invention is not to be limited to the particular details, as shown and described above, but that, in fact, widely different means may be employed in the practice of the broader aspects of the invention.

We claim:

1. A combine harvester (1) comprising
a threshing and separating mechanism (8),
a cleaning mechanism (9) disposed to receive threshed and separated crop material from said threshing and separating mechanism (8) and operable to separate tailings therefrom,
tailings rethresher means (44) associated with said cleaning mechanism (9) for rethreshing the tailings separated therein, and
tailings conveyor means (52) for recycling rethreshed tailings from said rethresher means (44) via a discharge aperture to said cleaning mechanism (9), the improvement comprising
a screen (86) provided above said cleaning mechanism (9) at a location offset from said discharge aperture (62) of said tailings conveyor means (52), said screen (86) intersecting the tailings flow and being operable to absorb the kinetic energy thereof which is imparted thereto by said tailings conveyor means (52) wherein across the width of said screen (86) and oriented perpendicularly to the tailings flow are a number of angled members (88, 89) attached to said screen (86).

2. A combine harvester (1) according to claim 1 wherein said angled members (88, 89) comprise a surface which extends from said screen (86), said surface of the angled members (89) nearest to the side of said discharge aperture (62) facing in the direction of said aperture (62) whereas said surface of the other angled members (88) remote from said discharge aperture (62) being oriented generally in the opposite direction.

3. A combine harvester (1) comprising
a threshing and separating mechanism (8),
a cleaning mechanism (9) disposed to receive threshed and separated crop material from said threshing and separating mechanism (8) and operable to separate tailings therefrom,
tailings rethresher means (44) associated with said cleaning mechanism (9) for rethreshing the tailings separated therein, and
tailings conveyor means (52) for recycling rethreshed tailings from said rethresher means (44) via a discharge aperture to said cleaning mechanism (9), the improvement comprising
a screen (86) provided above said cleaning mechanism (9) at a location offset from said discharge aperture (62) of said tailings conveyor means (52), said screen (86) intersecting the tailings flow and being operable to absorb the kinetic energy thereof which is imparted thereto by said tailings conveyor means (52), and
a deflector (72) operatively associated with said discharge aperture (62) of said tailings conveyor means (52) to receive the tailings emerging therefrom, said deflector comprising at least two individually directed deflector elements extending in the general direction of said screen (86) to substantially evenly spread said tailings across the full width of said cleaning mechanism (9) in the direction of said screen (86).

4. A combine harvester (1) according to claim 3 wherein said deflector (72) is arcuately shaped and said individually directed deflector elements each comprise a separate deflector strip (76 to 78) in the path of operative flow of crop material being discharged from said aperture (62) and having different radii of curvature, the arrangement being such that each individual deflector strip (76, 77 or 78) is operable to deflect the crop material passing thereover in a generally predetermined direction which differs from the directions obtained with the other deflector strips (76, 77 or 78).

5. A combine harvester (1) according to claim 4 wherein said directions of deflection vary from the transverse side of the cleaning mechanism (9) furthermost of said deflector (72) towards the transverse side of the cleaning mechanism (9) nearest thereto.

* * * * *